United States Patent Office 3,323,173
Patented June 6, 1967

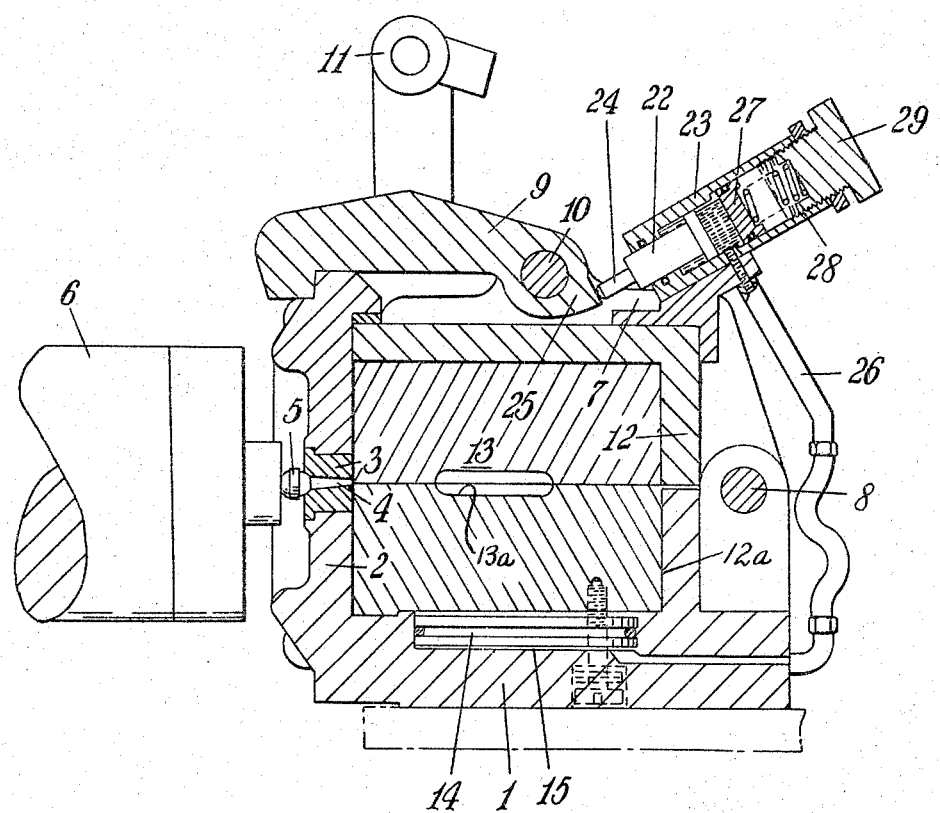

3,323,173
APPARATUS FOR INJECTION MOLDING
William F. Poyner, Blackburn, England, assignor to Foster Yates & Thom Limited, Blackburn, England, a British company
Filed Mar. 30, 1964, Ser. No. 355,675
Claims priority, application Great Britain, Apr. 5, 1963, 36,307/63
5 Claims. (Cl. 18—30)

This invention relates to apparatus for injecting molding plasticized material and has for its main object to prevent the occurrence of flash in molds of the kind which are enclosed in a carrier formed of hinged or separable parts which can be opened to separate the mold parts for removing the molded article.

The invention consists in an apparatus of the kind referred to in the preceding paragraph, wherein fluid operated piston means are provided which are so arranged as to hold the mold parts together within the carrier and thereby exert a positive closing pressure on the mold parts during the injection molding, and substantially obviate any danger of flash occurring between such mold parts, with means being provided whereby the application of the required pressure to said piston means is automatically effected by the closing of the mold carrier.

According to the preferred arrangement, the displacement of the controlling fluid for effecting the operation of said piston means is brought about by an auxiliary piston member so arranged as to be automatically actuated by the closing of the mold carrier.

The invention will be more completely understood from the following detailed description which is given in conjunction with the accompanying drawing in which the single figure which is a side view partly in section and partly in elevation of an injection molding apparatus constructed in accordance with the invention and showing the forward part of the injection cylinder and an injection mold in which the mold parts are enclosed in a carrier composed of hinged parts which can be opened to separate the mold parts for removing the molded article.

Referring now to this figure, the mold carrier is constructed in the form of a hollow box-like structure comprising a base member 1, a front member 2 having a sprue bushing 3, through the bore 4 of which plasticized material may be injected into the mold from a nozzle 5 of an injection cylinder 6, a top member 7 hinged at 8 to the base member 1 and a latch member 9 hinged at 10 to the top member 7 so as to be engageable with the front member 2 when the mold carrier is closed. A sectional mold denoted generally 13 includes an upper mold part 12 and a lower mold part 12a which when in operative relationship provide a molding cavity 13a. The latch member 9 is provided with linkage means 11 which is adapted to cause the latch member 9 to open, and the top member 7 to swing back carrying the upper mold part 12 of the mold with it when it is desired to open the mold.

In order that a positive clamping pressure may be exerted on the mold parts 12 and 12a during injection, the base member 1 of the mold carrier is provided with a fluid operated piston 14 mounted in a cylinder 15 supplied with hydraulic fluid under the control of an auxiliary actuating piston 22 which is slidably mounted in a cylinder 23. The piston 22 includes an actuating rod 24 which is adapted to engage with a tail-piece 25 formed on the latch member 9. The cylinder 23 communicates through a side port with a tube 26 which leads to the cylinder 15, so that when the latch member 9 closes, the auxiliary piston 22 is actuated by the tail of the latch to force the controlling fluid down the tube 26 and exert pressure on the piston 14. The amount of pressure exerted is conveniently controlled by a plug 27 which is spring loaded by means of a helical spring 28, the tension of which spring 28 can be adjusted by means of a screw plug 29 so that by means of this arrangement, the required amount of force to pressurize the fluid operated piston 14 controlling the mold parts to the value necessary to produce the required clamping pressure is automatically supplied at the instant the latch member 9 is moved into the closed position.

The invention may be readily applied to mold carriers of various constructional types where means are required for preventing the occurrence of flash between the mold parts during the injection operation.

What is claimed is:

1. In an injection molding apparatus, a mold carrier including upper and lower parts hingedly connected for relative movement between open and closed positions, a first mold element carried by said upper part, a second mold element positioned in said lower part with said mold elements coacting to define a molding cavity when said upper and lower parts are in the closed position, means for injecting plasticized material into the molding cavity, said lower part having a cylinder therein, a piston mounted in said cylinder for exerting a positive closing pressure on said second mold element to maintain said first and second mold elements together when plasticized material is injected into the molding cavity for eliminating flash, and means operably related to said upper part and said cylinder for applying fluid pressure to said piston when said upper and lower parts are in the closed position.

2. The injection molding apparatus as claimed in claim 1 in which said fluid pressure applying means includes an auxiliary cylinder and piston unit automatically actuated when the upper and lower parts are in the closed position and conduit means between the auxiliary cylinder and said cylinder in the lower part.

3. In an injection molding apparatus, a mold carrier including a lower part, an upper part hingedly connected to the lower part to permit opening and closing of the carrier, a first mold element carried by the upper part, a second mold element movably positioned in said lower part, with said first and second mold elements coacting to define a molding cavity when the carrier is closed, means for injecting plasticized material into the molding cavity, said lower part having a cylinder therein, a piston mounted in said cylinder for exerting a positive closing pressure on said second mold element to maintain said mold elements together when plasticized material is injected into the molding cavity for eliminating flash, an auxiliary fluid cylinder mounted on said upper part, a piston in said auxiliary cylinder, conduit means between said auxiliary cylinder and said cylinder in said lower part, and complementary means on said upper part and the piston in said auxiliary cylinder operative on closing of the carrier to displace the fluid in the auxiliary cylinder and apply fluid pressure to the piston in the lower part via said conduit means.

4. The injection molding apparatus as claimed in claim 3 in which the end of said auxiliary cylinder opposite the piston therein is closed by a spring-loaded slidable plug arranged for causing the required pressure to be applied to the piston in the lower part and means for adjusting the spring loading of the plug.

5. The injection molding apparatus as claimed in claim 4 in which said plug is spring loaded by a helical spring held in position by a screw plug mounted in the end of the auxiliary cylinder with said screw plug constituting the means for adjusting the spring loading of the plug.

References Cited

UNITED STATES PATENTS 3,199,159  8/1965  Wernecke _____ 18—30 XR

FOREIGN PATENTS 566,491  11/1958  Canada.

J. SPENCER OVERHOLSER, *Primary Examiner.*

W. L. McBAY, *Assistant Examiner.*